United States Patent [19]

Matusz

[11] Patent Number: 5,061,432
[45] Date of Patent: Oct. 29, 1991

[54] APPARATUS FOR FACILITATING THE SERVICING OF INVERTED CANNED PUMP MOTORS HAVING LIMITED ACCESS SPACE AND RESTRICTED ACCESS TIME ESPECIALLY IN NUCLEAR POWER PLANTS

[75] Inventor: John M. Matusz, Plum Boro, Pa.

[73] Assignee: Westinghouse Electric Corp., Pittsburgh, Pa.

[21] Appl. No.: 489,134

[22] Filed: Mar. 5, 1990

[51] Int. Cl.$^5$ .............................................. G21C 19/10
[52] U.S. Cl. .................................................... 376/260
[58] Field of Search ............... 376/260, 262, 379, 362, 376/361; 29/723, 906; 187/9 R

[56] References Cited

U.S. PATENT DOCUMENTS

| Re. 33,373 | 10/1990 | Gallo et al. | 376/260 |
|---|---|---|---|
| 3,941,259 | 3/1976 | Hoffmeister et al. | 376/260 |
| 4,696,786 | 9/1987 | Frizot et al. | 376/260 |
| 4,847,038 | 7/1989 | Martin | 376/260 |
| 4,873,760 | 10/1989 | Watanabe et al. | 376/260 |
| 4,973,433 | 11/1990 | Larson et al. | 376/260 |

*Primary Examiner*—Brooks H. Hunt
*Assistant Examiner*—Frederick H. Voss

[57] ABSTRACT

Service apparatus is provided for a large inverted canned motor pump installed above a floor and beneath a large steam generator in a fossil or nuclear power plant with limited access space and with limited access time at least in the case of nuclear power plants. The canned motor pump has a pump casing and a depending motor having a flange secured to a pump casing flange by a plurality of tensioned studs with tightened nuts.

The service apparatus includes a maintenance cart having a height greater than the height of the motor casing beneath the motor flange and further having a generally U-shaped frame with an open vertical side that permits the cart to be moved horizontally such that the cart frame can be moved under the pump casing to surround the depending motor.

Three electromechanical actuators are supported by the cart frame and each has a downwardly extending translating arm engageable with respective motor lugs near the bottom of the motor. The translating arms are operated to support, raise and lower the motor with its axis vertical or at an incline to the vertical. The motor is supported on top of the cart frame prior to raising the motor to its installed position and after the motor has been released from its installed position and lowered to the cart.

A work platform is provided on top of the cart by a plate welded to the top of the framework platform and a removable platform section extending across the open side of the frame. A personnel platform is provided on the cart art an elevation below the work platform. The personnel platform includes a swing down section on the bight cart side, two fixed sections on the two leg sides of the cart and a removable section on the open cart side. Rollers are provided on the bottom of the cart frame to facilitate horizontal cart movement along the floor.

19 Claims, 16 Drawing Sheets

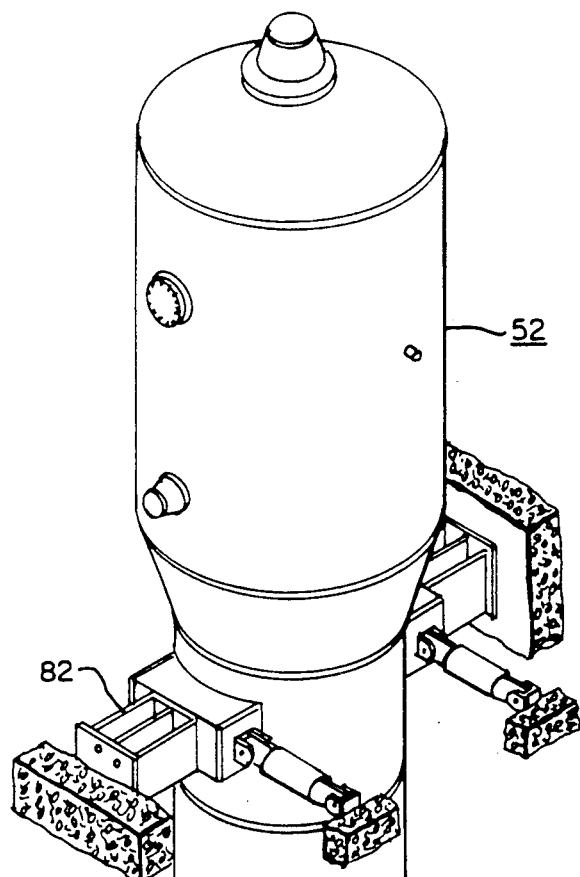
FIG. 2.
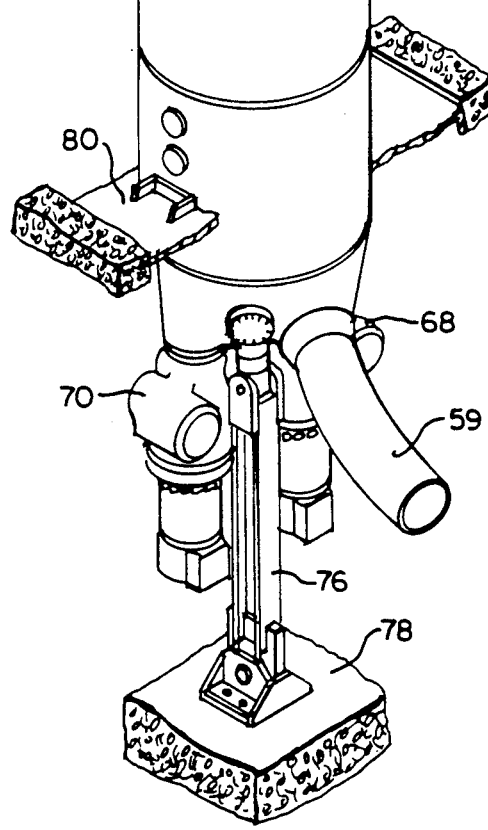

APPARATUS FOR FACILITATING THE SERVICING OF INVERTED CANNED PUMP MOTORS HAVING LIMITED ACCESS SPACE AND RESTRICTED ACCESS TIME ESPECIALLY IN NUCLEAR POWER PLANTS

CROSS-REFERENCE TO RELATED APPLICATIONS

None.

BACKGROUND OF THE INVENTION

The present invention relates to nuclear power plants and service assist apparatus for motor pumps and especially to apparatus that is useful in facilitating the servicing of inverted main coolant pump motors for which there is limited access space and limited access time in a nuclear power plant.

In typical prior nuclear power plant applications, conventional shaft seal type system have been used or where canned coolant pumps have been used they have been mounted right-side up, i.e. with the motor end of the unit facing upwardly. Even through the motor and its casing are very heavy (such as 57,000 pounds), the motor in such a canned pump unit can be removed for servicing or replacement in a straightforward manner because vertical access space is normally available for use of conventional disassembly tools and lifting equipment in removing the casing studs and lifting the motor upwardly from the pump unit. In fossil power plants where inverted canned motor pumps have been used for some time, vertical access space for pump motor removal has been relatively unrestricted so that conventional plant service equipment and tools can be used by service personnel.

In a new nuclear power plant design developed by the assignee of the present application in which safe and reliable operation is based on passive control, each vertically elongated steam generator is contained within a relatively narrow vertical chamber with main canned coolant pumps located in an inverted position with the pump casing suction nozzle welded to the bottom of the steam generator channel head for operation in the reactor coolant looping. The bottom of the pump unit is relatively close to the chamber floor so that vertical access space is highly limited. In addition, access time is effectively limited by considerations of radiation exposure to service personnel.

The nuclear power plant operating and safety advantages for the inverted canned motor pump configuration are significant. First, auxiliary fluid systems needed to support a canned motor pump are much less complex than those needed for a shaft seal type pump. Further, the canned motor pump inherently reduces small (LOCA) coolant loss potential, has a demonstrated record of high reliability and is more tolerant of off design conditions than the shaft seal pump is. The close coupling of the pump suction to the bottom of the steam generator channel head eliminates the need for a crossover coolant piping leg thereby improving the small break (LOCA) transient. Such close coupling also reduces loop pressure drop, simplifies the foundation and support system for the steam generator, pumps and piping, and considerably reduces the cost and complexity of primary coolant loop piping.

With the described inverted disposition, the pump units are located such that removal of the pump motor requires that the motor be supported while the casing studs are withdrawn. Once the studs are removed, the motor must be dropped downwardly to clear the pump unit flange and it then must be transferred in the lateral direction to clear the steam generator. The pump motor must be moved to a point where a narrow shaft like vertical space is provided within the chamber for vertical lifting of the motor upwardly along the steam generator to a point where it can be removed from the chamber. Installation of a motor pump involves reverse requirements.

Accordingly, it is desirable that apparatus be developed to facilitate the servicing of inverted canned motor pumps under the described conditions.

SUMMARY OF THE INVENTION

Service apparatus is provided for a large inverted canned pump motor installed above a floor and beneath a large steam generator in a fossil or nuclear power plant with limited access space and with limited access time at least in the case of nuclear power plants. The canned motor pump has a pump casing and a depending motor having a flange secured to a pump casing flange by a plurality of tensioned studs with tightened nuts.

The service apparatus includes a maintenance cart having a height greater than the height of the motor casing beneath the motor flange and further having a generally U-shaped frame means with an open vertical side that permits the cart to be moved horizontally such that the cart frame means can be moved under the pump casing to surround the depending motor.

Actuator means are supported by the cart frame means and are provided with translating arm means engageable with support means on the motor. The translating arm means are operated to support, raise and lower the motor. The motor is supported relative to the cart frame means prior to raising the motor to its installed position and after the motor has been released from its installed position and lowered to the cart.

Work platform means are provided on the cart frame means at an elevation beneath but near the motor flange elevation. Roller means are provided on the bottom of the cart frame means to facilitate horizontal cart movement along the floor.

BRIEF DESCRIPTION OF THE DRAWINGS

FIG. 2 is a perspective view of one of the steam generators illustrating its disposition and support within its plant compartment and further illustrating the restricted vertical and lateral space for servicing access to the inverted pumps at the bottom of the steam generator;

DESCRIPTION OF THE PREFERRED EMBODIMENT

Figure 1:
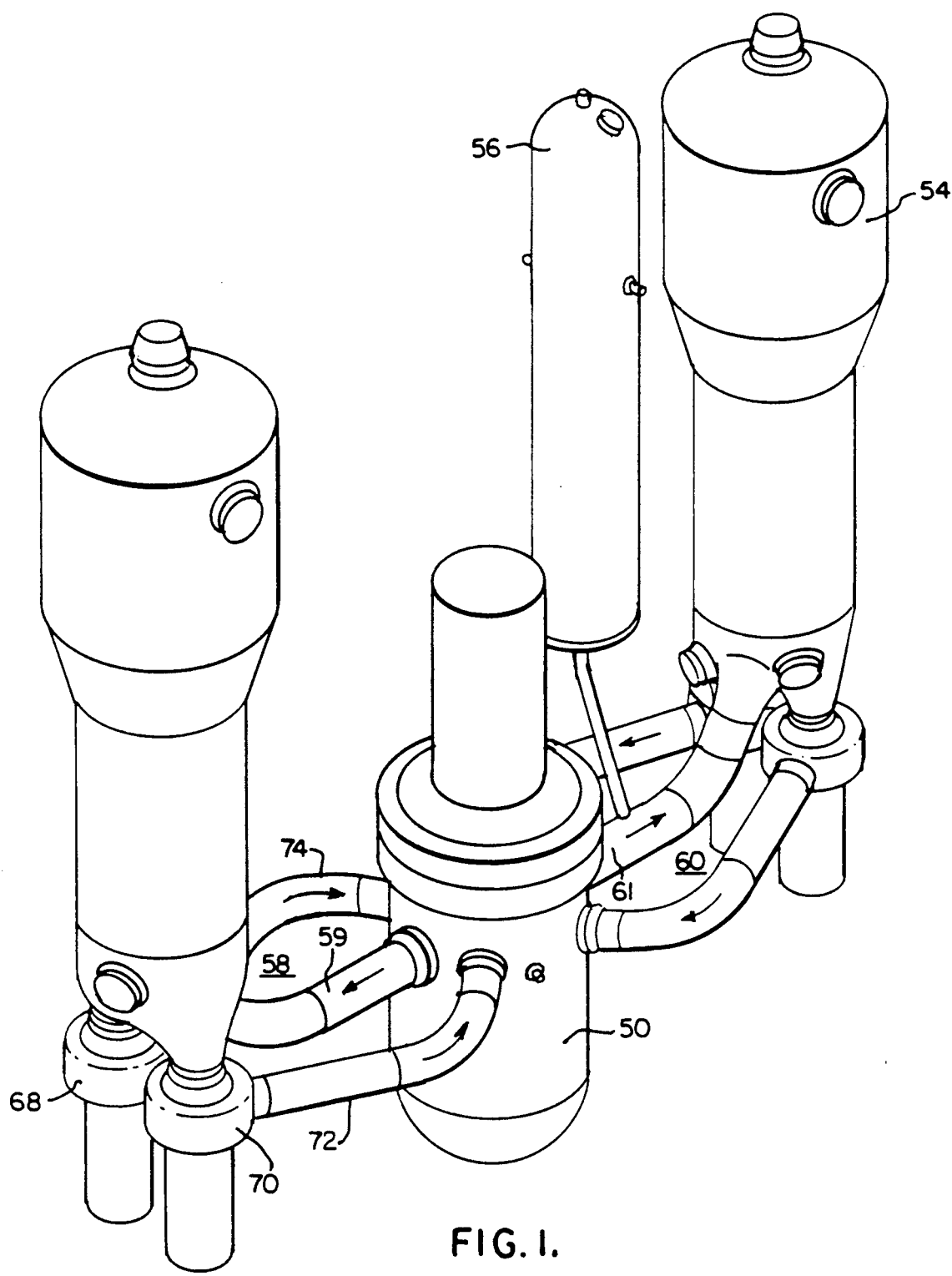
FIG. 1 is a perspective schematic view of a nuclear reactor power plant having a pair of coolant loops with respective like steam generators having inverted canned motor pumps of the type and disposition for which servicing can be provided in accordance with the invention.

As shown in FIG. 1, the basic components of a pressurized water nuclear power plant include a reactor vessel 50 disposed in a well 51 (FIG. 3), a pair of steam generators 52 and 54 and a pressurizer 56. Respective like coolant loops 58 and 60 couple the steam generators 52 and 54 with the reactor vessel 50.

Figure 4:
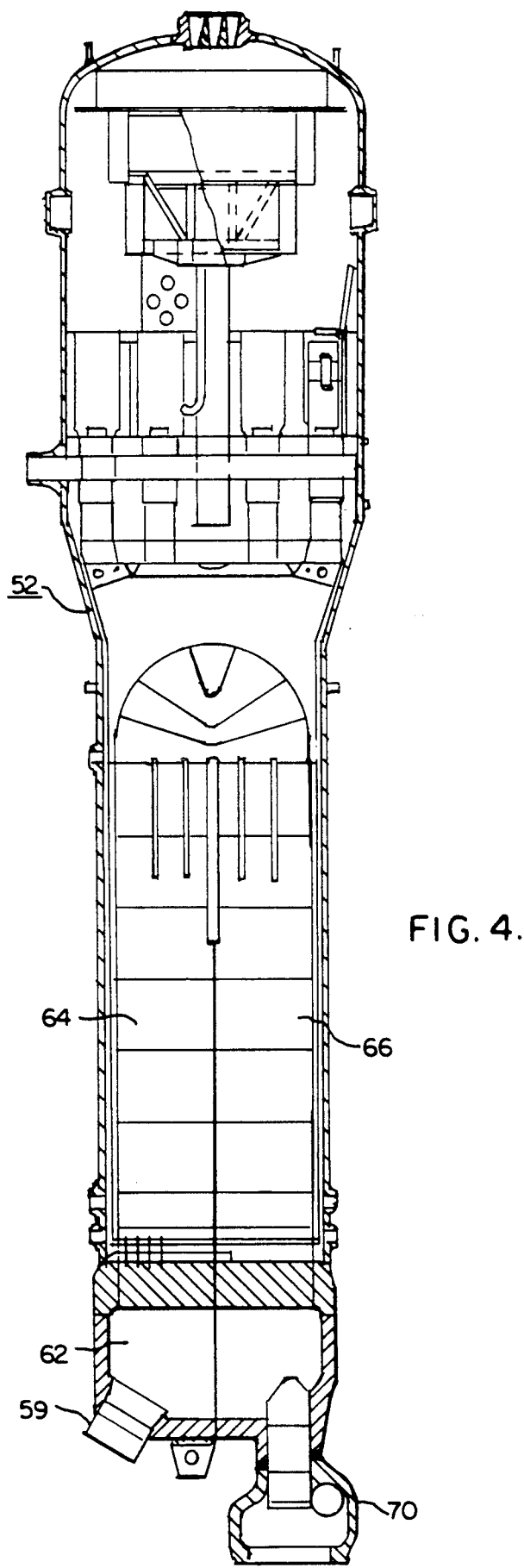
FIG. 4 shows a vertical section of the steam generator to illustrate generally its internal coolant flow.
Figure 6:
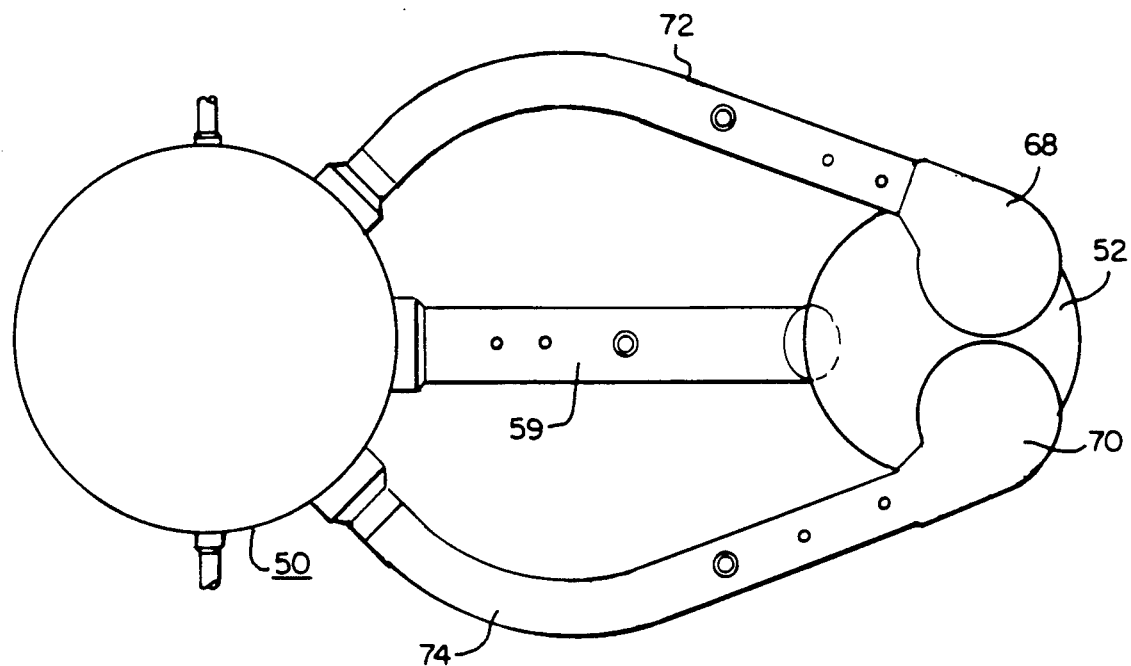
FIG. 6 shows a bottom plan view of the reactor coolant loop for the steam generator of FIG. 2.

Each coolant loop 58 or 60 includes a hot leg 59 or 61 which supplies heated coolant from the reactor 50 to the associated generator 52 or 54. As shown in FIG. 4, the heated coolant enters the steam generator through nozzle 59 and into a channel head 62 and passes upwardly through region 64 inside heat transfer tubing. Feedwater passing over the tubing is converted to motive steam. The hot coolant undergoes a temperature drop as it progresses inside the heat transfer tubing and returns downwardly through generator region 66 to an exit portion of channel head and then a pair of inverted canned motor pumps 68 and 70 for return to the reactor 50 through a pair of cold coolant legs 72 and 74 (FIGS. 1 and 6).

Figure 3:
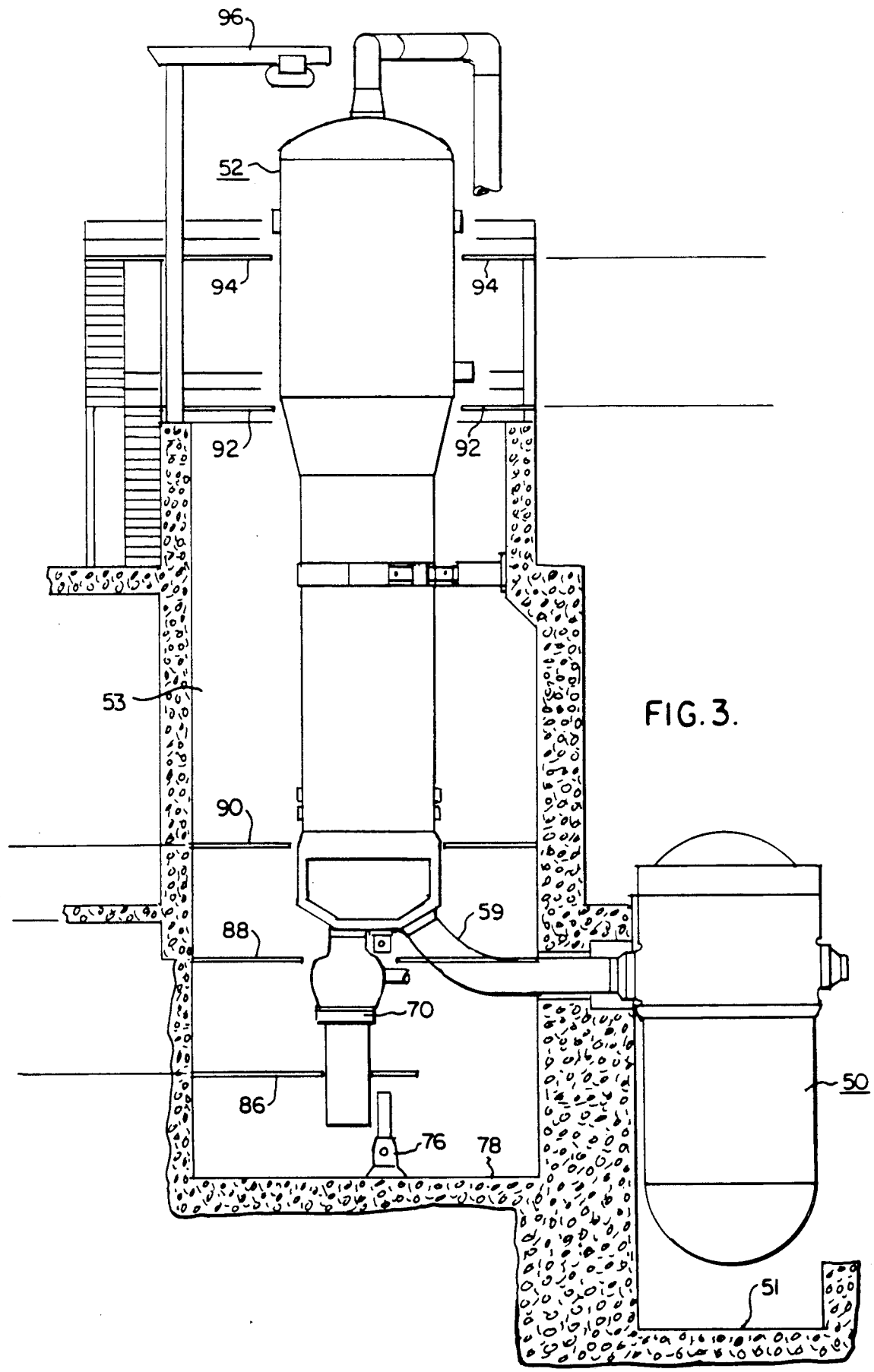
FIG. 3 is an elevation view of the steam generator supported in its plant compartment and coupled through one of the two coolant loops to the adjacent nuclear reactor vessel disposed at a lower elevation in a reactor well.

Since the two steam generators are alike, only one of them, i.e. the steam generator 52, will be further described in the description of the invention. As shown in FIG. 3, the steam generator 52 is supported in a vertically elongated compartment 53.

The support arrangement is best observed in FIG. 2 and it includes a vertical column support 76 which holds the unit so that the bottom of the steam generator 52 is a relatively short distance from a floor 78 of the compartment 53. For example, the bottom of the steam generator might be about 18 feet above the compartment floor 78 as most clearly observed in FIG. 5 where a human figure is shown to provide a general indication of height. In addition to the column support 76, a lower lateral support 80 (FIG. 2) and an upper lateral support 82 are provided for the steam generator 52.

Figure 5:
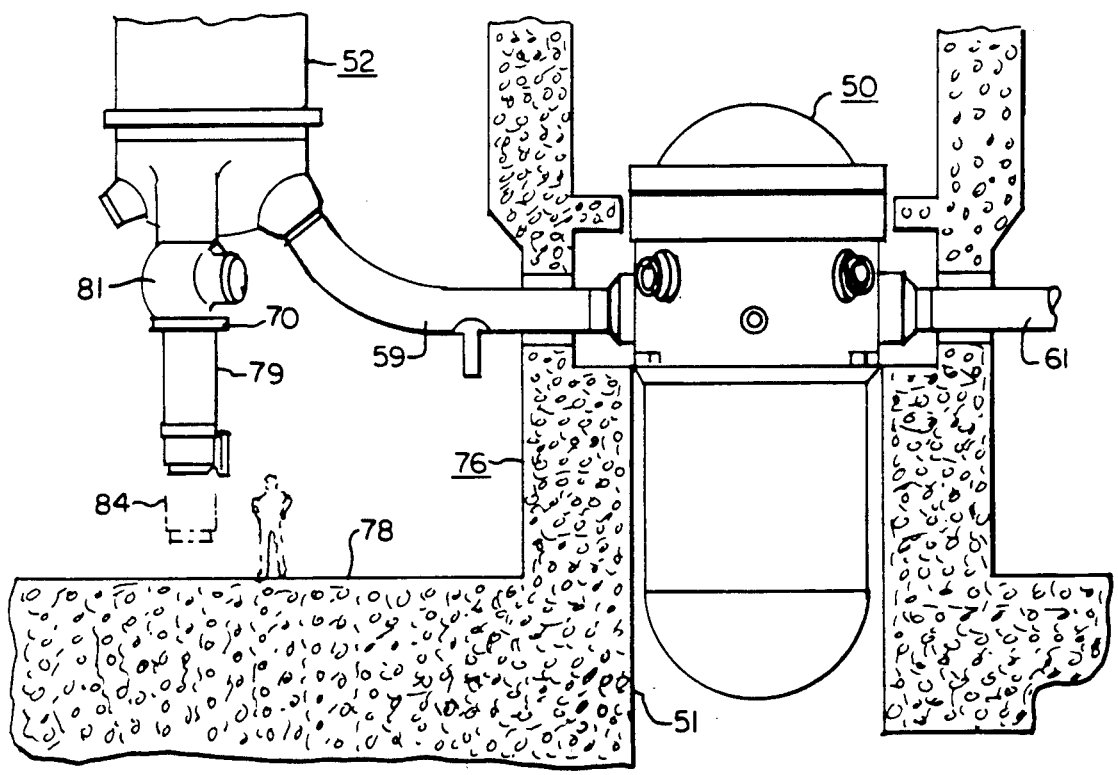
FIG. 5 shows an elevation view of an enlarged bottom portion of the steam generator and the adjacent reactor to illustrate more clearly the limited pump service access space.
Figure 9:
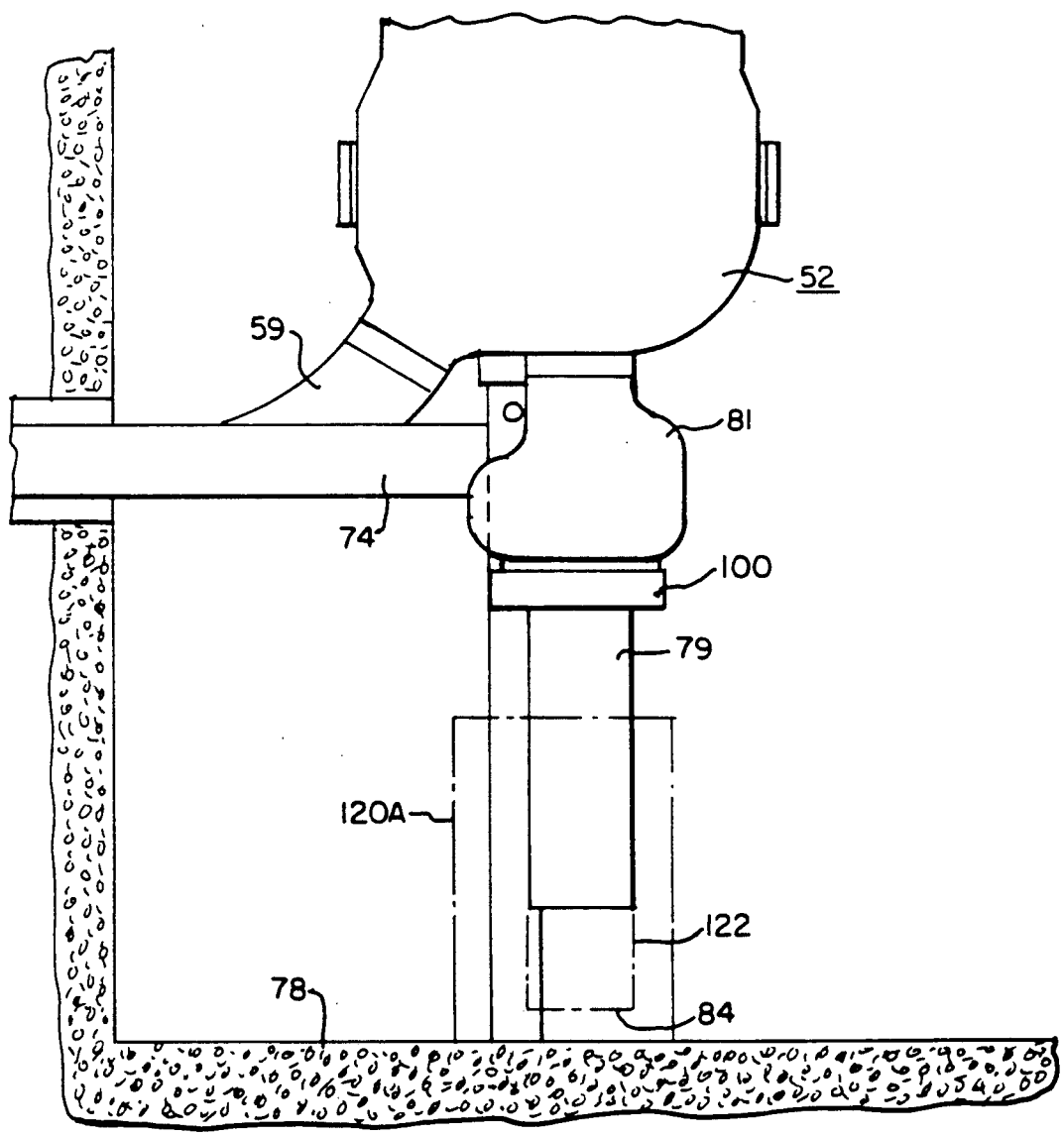
FIG. 9 shows the bottom portion of the steam generator compartment and the general manner in which service apparatus is disposed for pump motor servicing in accordance with the invention.

With reference to FIGS. 5 and 9, the inverted canned motor pump 70 depends from the bottom of the steam generator 52 so that the bottom of the unit, i.e. the bottom of a motor portion 79 of the unit, is about four feet above the compartment floor 78. The motor portion 79 of the pump 70 must be lowered from pump casing 81 at least to the point where the bottom of the motor 79 is less than one foot above the compartment floor 78 as indicated by dotted box 84. At this point, the motor 79 can be moved laterally with a clear path for the motor top to a point along the compartment floor 78 where the motor can be removed vertically upward for servicing. The opposite sequence takes place when the motor is being delivered for installation.

With reference again to FIG. 3, various platforms are provided along the height of the compartment 53, including a pump platform 86, a lower manway platform 88, a tube sheet platform 90, a feedwater nozzle platform 92, and an upper manway platform 94. A jib crane 96 is provided on the upper operating platform 94 to enable equipment items to be raised and lowered in the space between the steam generator 52 and its compartment 53. The various platforms are structured to enable loads to be raised and lowered along the full height of the compartment 53.

In the described plant environment, the access space available for placing or removing the pump motor 79 into or from its installed location is severely restricted. The space restriction exists both vertically as to the space available for raising and lowering the motor at its placement location and as to the lateral space available for moving the motor between its lateral placement location under the steam generator 52 and the lateral point where it can be raised from or lowered to the compartment floor 78.

Access time is also restricted since all tasks that have to be performed as a part of refueling service must be performed expeditiously to minimize radiation exposure consistent with considerations of safety, reliability and quality.

PUMP MOTOR AND ITS SERVICE APPARATUS

Figure 7:
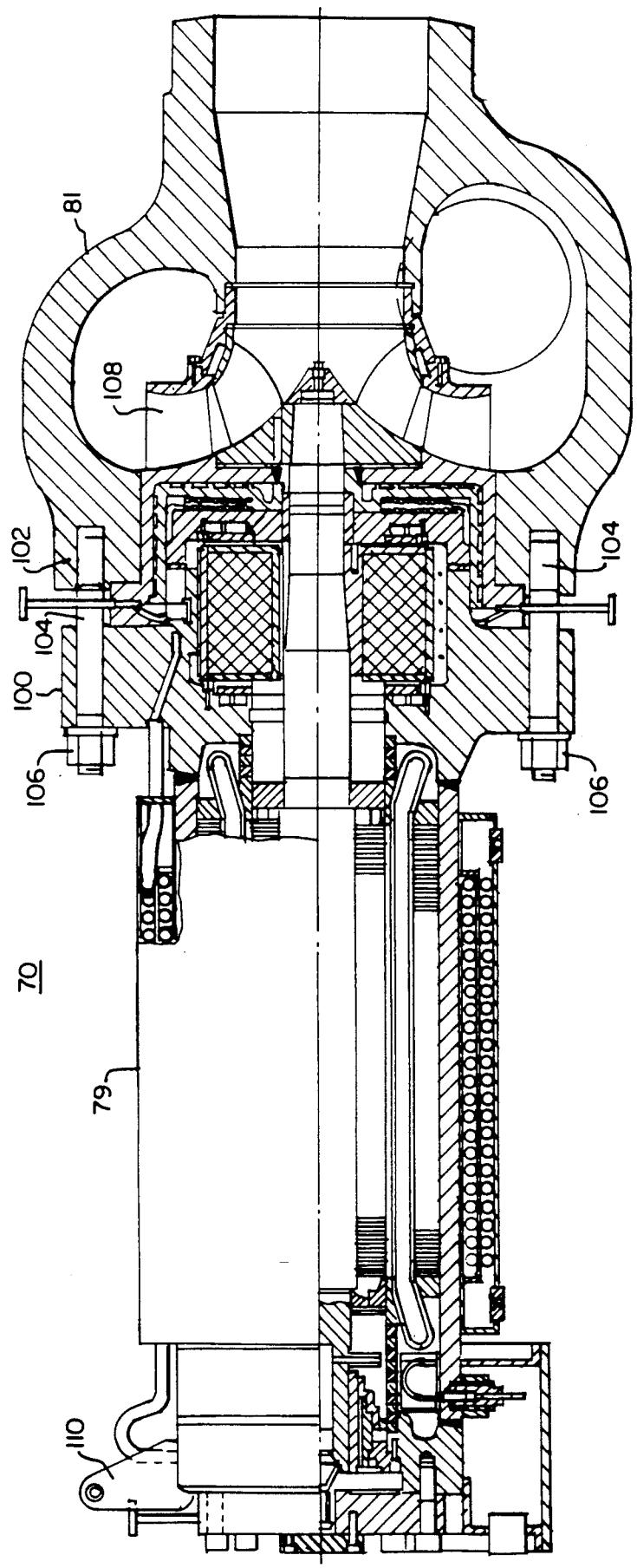
FIG. 7 is a partial longitudinal section taken through a canned motor pump unit of the type employed with the steam generator.
Figure 8:
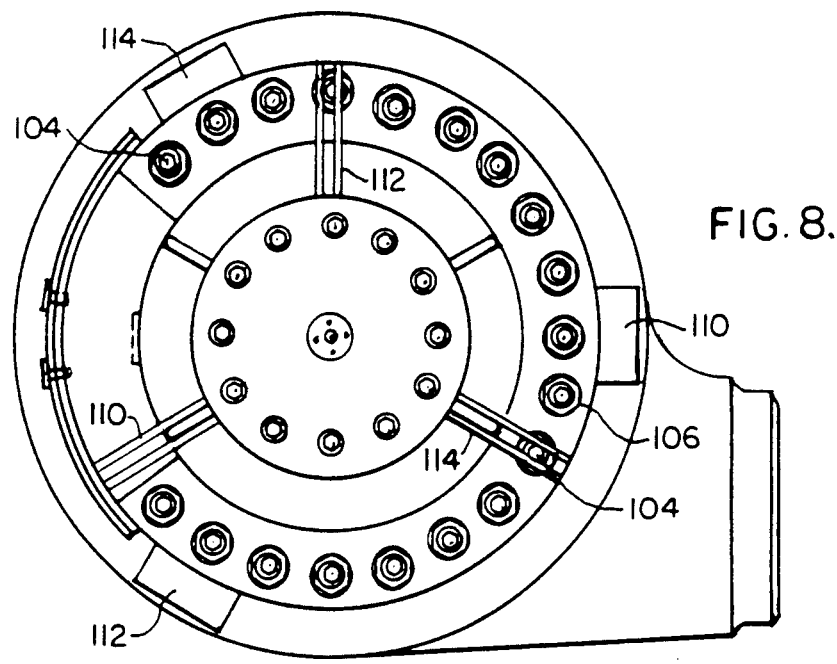
FIG. 8 shows a bottom plan view of the pump unit illustrating the manner in which the motor flange is secured to the pump casing.

The pump unit is shown with greater detail in FIGS. 7 and 8. The pump casing 81 is a large structure, in this case having a weight of 28,000 pounds, and it is placed through an opening in the steam generator vessel and rigidly secured thereto by welding.

The motor unit 79 is provided with a flange 100 that is secured to a flange 102 on the pump casing 81. A total of 24 threaded studs 104 (weighing over 60 pounds each) and associated nuts 106 provide the securance. The motor unit 79 in this case weighs 39,000 pounds thereby requiring machine support in the handling of the motor unit 79 during installation and removal for service. Thus, machine support is required to hold the motor unit 79 when the studs 104 are being manually secured or removed and to lift or lower the motor unit 79 to or from its installed position.

As can be observed in FIG. 7, an impeller 108 is mounted on the motor shaft. For the top end of the motor unit 79 to have a clear lateral path for lateral transfer during service removal, it is thus necessary that the motor unit 79 be dropped at least that distance which is necessary for the outer end of the impeller to be below the pump casing flange 102. Because of the limited vertical access space in the present case, it is also necessary to remove a group of the downwardly projecting studs 104 to make it possible to transfer the motor horizontally once it has been lowered from the pump casing.

Preferably, three lifting lugs 110, 112 and 114 (FIGS. 7 and 8) are provided on the motor casing for machine assisted raising and lowering of the motor unit 79 during installation or service removal. The number of lugs employed is preferably three so as to facilitate load balancing during lifting operations and specifically to facilitate lifting or dropping the motor unit 79 with its axis at a predetermined incline to the vertical direction. Under certain thermal conditions, the state of the steam generator expansion is such that the pump casing 81 becomes oriented with its axis slightly inclined to the vertical making it necessary that the motor unit 79 be correspondingly inclined during installation and removal.

Conventional hydraulic tensioners can be employed on the studs 104 during nut tightening and removal. For example, tensioning equipment supplied by the Flexitallic Gasket Company, Inc. may be employed.

The basic component of the motor service apparatus is a maintenance cart 120 represented by a dotted box 120A in FIG. 9. As shown, the cart 120 is about 10 feet high and it is about 5 feet long by 4 feet wide. Dotted line 122 indicates the position of the bottom of the motor unit 79 when it has been dropped to rest on the cart 120.

Figure 11:
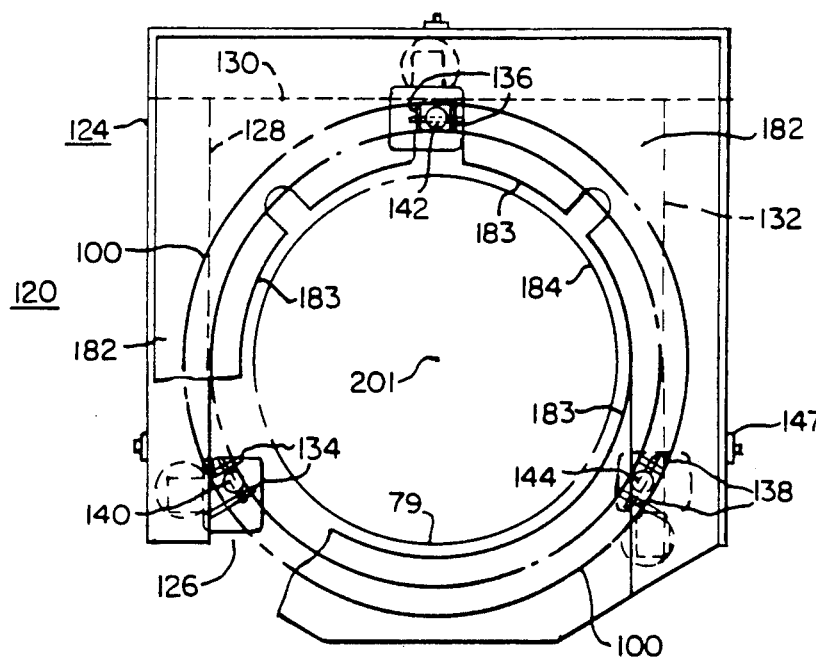

Generally, the cart 120 is structured to support the weight of the pump motor 79 and to facilitate horizontal transfer of the cart to and from a location under the pump motor. As observed in FIG. 11 which shows a top plan view of the cart 120 (with the motor shown in dotted outline), the cart is provided with a frame 124 that is U-shaped along its entire height thereby providing an open side 126 through which the motor 79 can pass as the cart is moved into and out of its work position under the motor 79.

Figure 10:
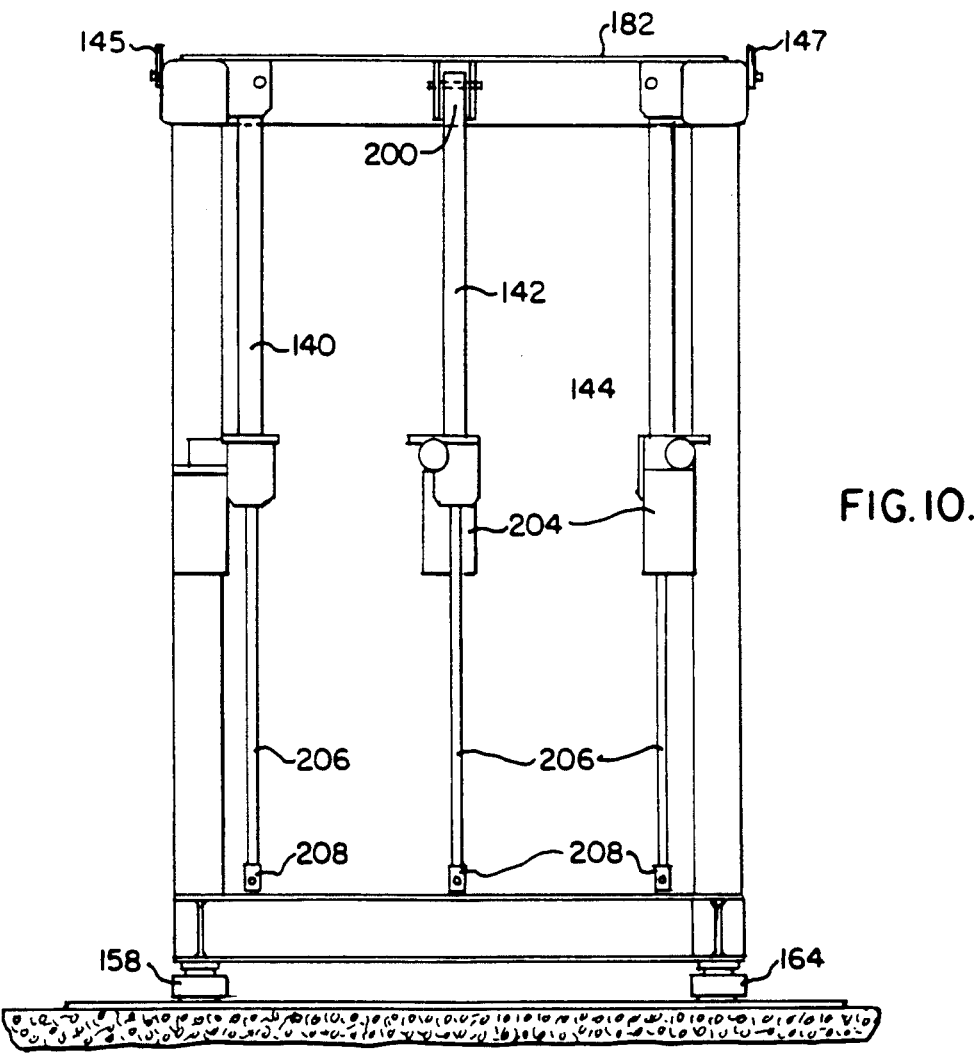

The frame is preferably a welded assembly of structural tubing and wide flange (WF) beams. Specifically, the frame top is formed by three tubes 128, 130, and 132 that form a U shape in a plane parallel to the plane of the motor flange and parallel to the compartment floor. Respective lugs 134, 136, and 138 are welded to the respective top tubes 128, 130, and 132 for attachment of mechanical actuators 140, 142, and 144 (FIG. 10) that are used to support, lift, and lower the pump motor 79. In addition, eye lugs 145 and 147 are respectively welded to the top tubes 128 and 132 to provide for crane lowering and lifting of the cart 120 to and from the compartment floor.

Figure 13:
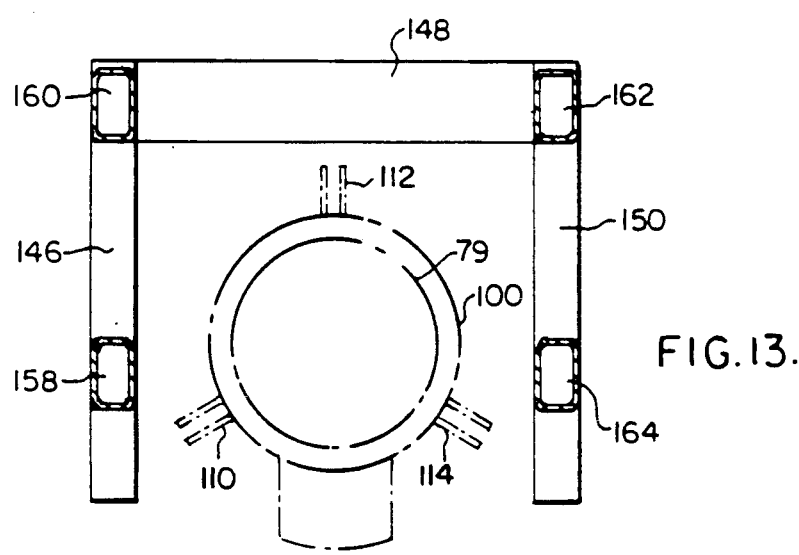

The frame bottom is formed by three WF beams 146, 148, and 150 (FIG. 13) in size and shape like the frame top. The top and bottom frame sections are connected at their corners by respective vertical tubes 152, 154, and 156 that operate as support columns.

Figure 12:
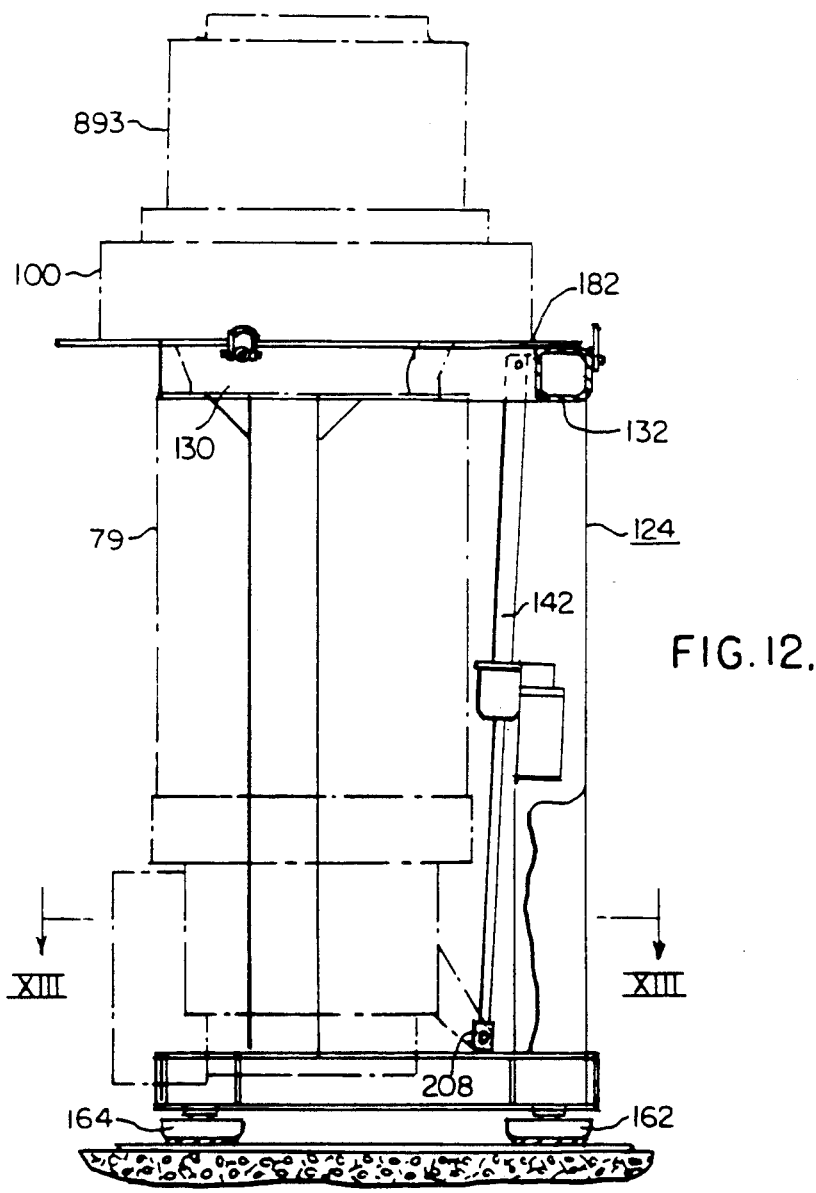

Four industrially rated roller units 158, 160, 162, and 164 having swivel capability (FIGS. 10, 12, and 13) are provided on the bottom of the bottom frame section at its four corners to facilitate steered horizontal movement of the cart 120 along the compartment floor. The top plate of each roller unit is preferably welded to the underside of the associated WF beam. For example, the roller units may be Hillman rollers with swivel and swivel lock rated at 30,000 pound capacity.

Figure 17:
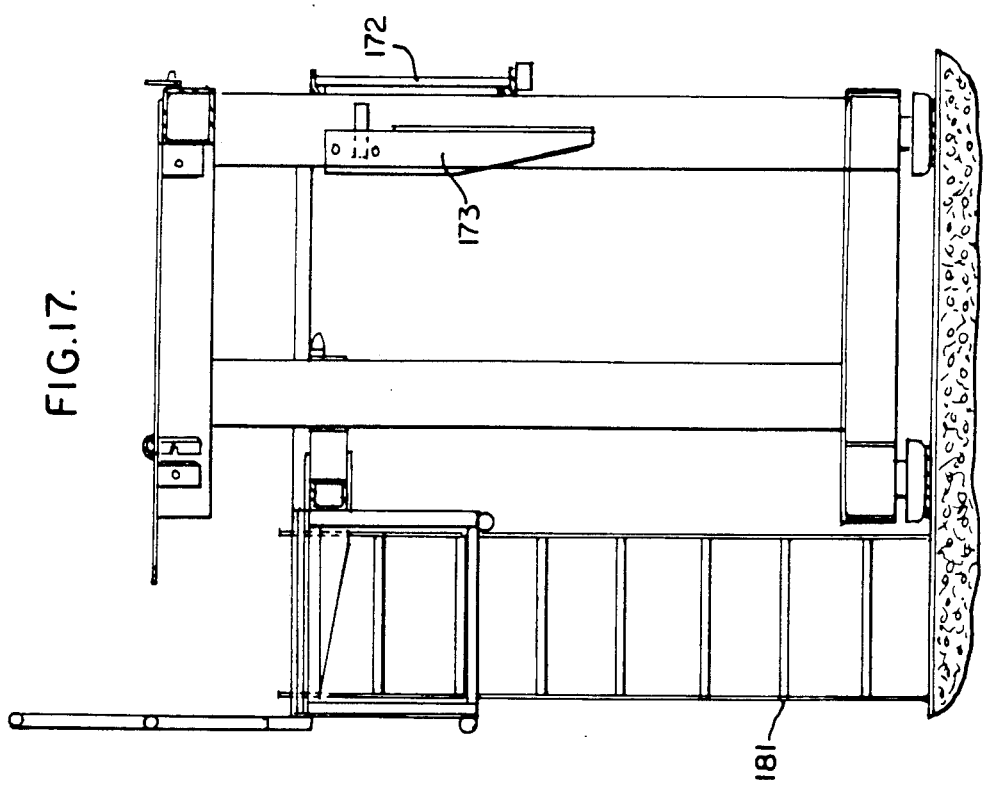
Figure 15:
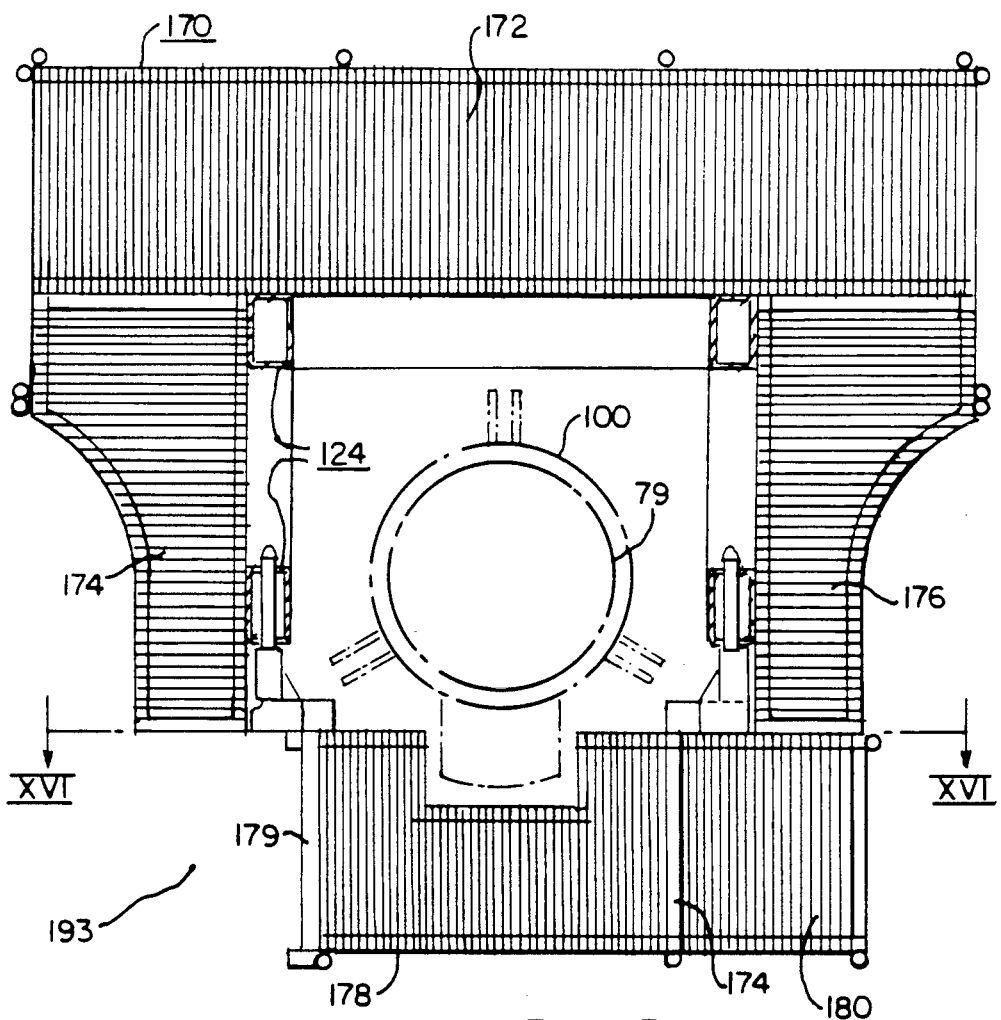
Figure 16:
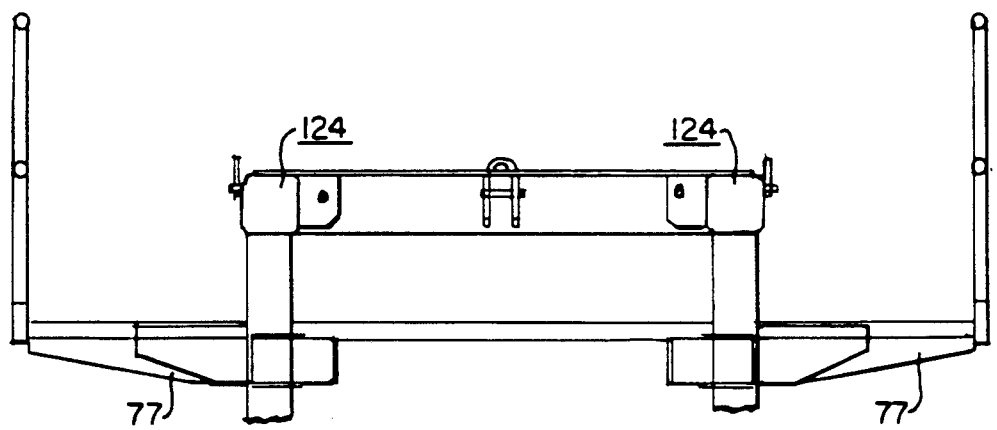

A personnel platform 170 (FIGS. 15 and 17) is preferably provided on the cart 120 so that service people can stand at an elevation from which the motor flange can be conveniently reached for work tasks that have to be performed. As shown, the platform 170 comprises a walkway 172 secured to the bight side of the U-shaped cart 120 preferably with swing down supports 173 (FIG. 17). Oppositely located side walkways 174 and 176 are secured to the cart frame 124 preferably by fixed supports 177 (FIG. 16). The side walkways 174 and 176 are contoured to enable and facilitate cart movement horizontally under the steam generator and around the adjacent pump motor.

Figure 18:
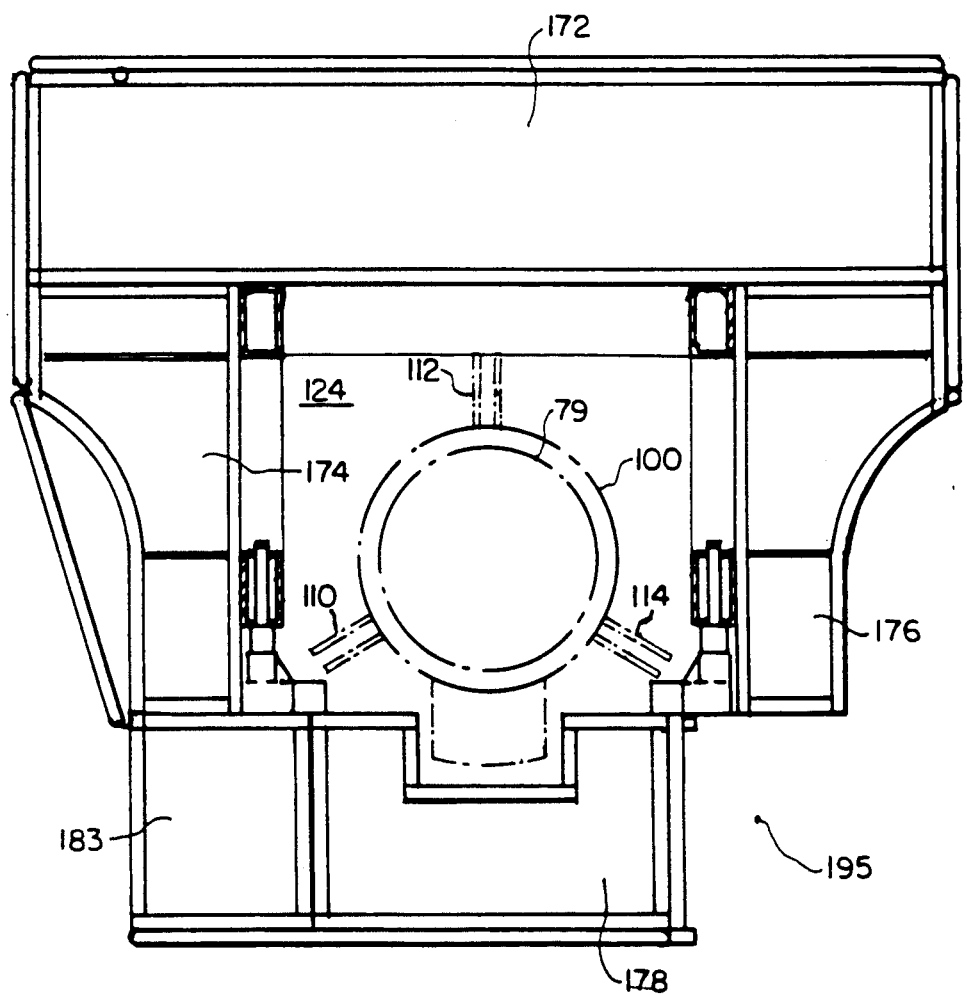
FIGS. 10 through 18 show various views of a maintenance cart which is the basic component of service apparatus of the invention.
Figure 14:
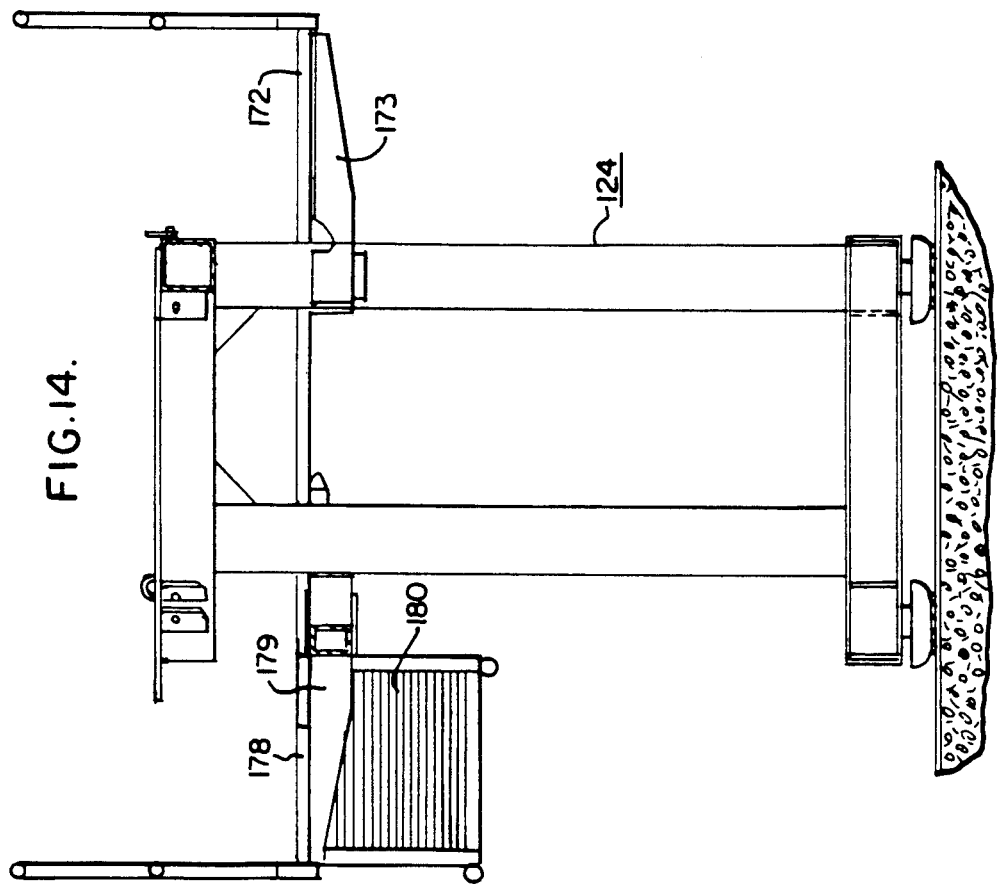

A removable walkway section 178 is supported on the open side of the cart 120 by supports 179 (FIG. 14). It can be put in place once the cart 120 has been put in place to surround the motor 79 as shown in FIG. 15. Swingdown end portions 180 (FIG. 15) and 183 (FIG. 18) provide for configuring the cart 120 to fit about the vertical steam generator support when either of the two inverted canned motor pump units is being serviced. A removable ladder 181 (FIG. 17) is provided for personnel to climb to the personnel platform 170.

A work platform is also provided on the cart 120. It is preferably formed by a generally U-shaped plate 182 welded to the top of the cart frame 124. The bight and leg sections of the plate 182 are sufficiently wide, as indicated by inner edge 183, that they provide a support ledge for the motor flange 100 after the motor 79 is lowered from its installed position. However, the spacing between the plate sections is large enough so that the motor casing 184 (FIG. 11) fits therebetween when the cart 120 is moved to pass the motor 79 through the open cart side 126.

The work platform further serves as a rest surface for accessory tools including stud tensioners and jacks used to lift and lower studs to and from the pump casing.

Conventional stud tensioners, such as Hydra-Tight Tensioners sold by the Flexitallic Gasket Company, may be used for nut securance and removal to and from the studs. Thus, on nut removal, the stud tensioners are manually lifted to the work platform and then placed on each stud 104 from which the nut is to be removed. In the present case, the studs 104 project below the upper surface of the motor impeller when the motor 79 is in its fully lowered position on the cart 120, and accordingly only those studs 104 need to be removed that would otherwise block the horizontal path of impeller movement when the cart 120 is moved to transfer the motor 79 horizontally from under the steam generator 52. In this case, only five studs 104 need to be removed.

The hydraulic connections between tensioner units are then completed and the tensioners are connected to the hydraulic pump. While the pump is energized, the studs 104 are detensioned so that the associated nuts may be loosened. When the hydraulic pump is deenergized, the loosened nuts may thereafter be manually removed. The opposite procedure is used when the motor 79 is being installed to the pump casing 81.

The studs 104 to be removed are next loosened, with a wrench if necessary, and unthreaded until removed. Since each stud weighs in excess of fifty pounds, it is preferred that a jack 190 (FIGS. 20 and 21) be used to lower or lift each stud 104 from or to its secured position.

Figure 20:
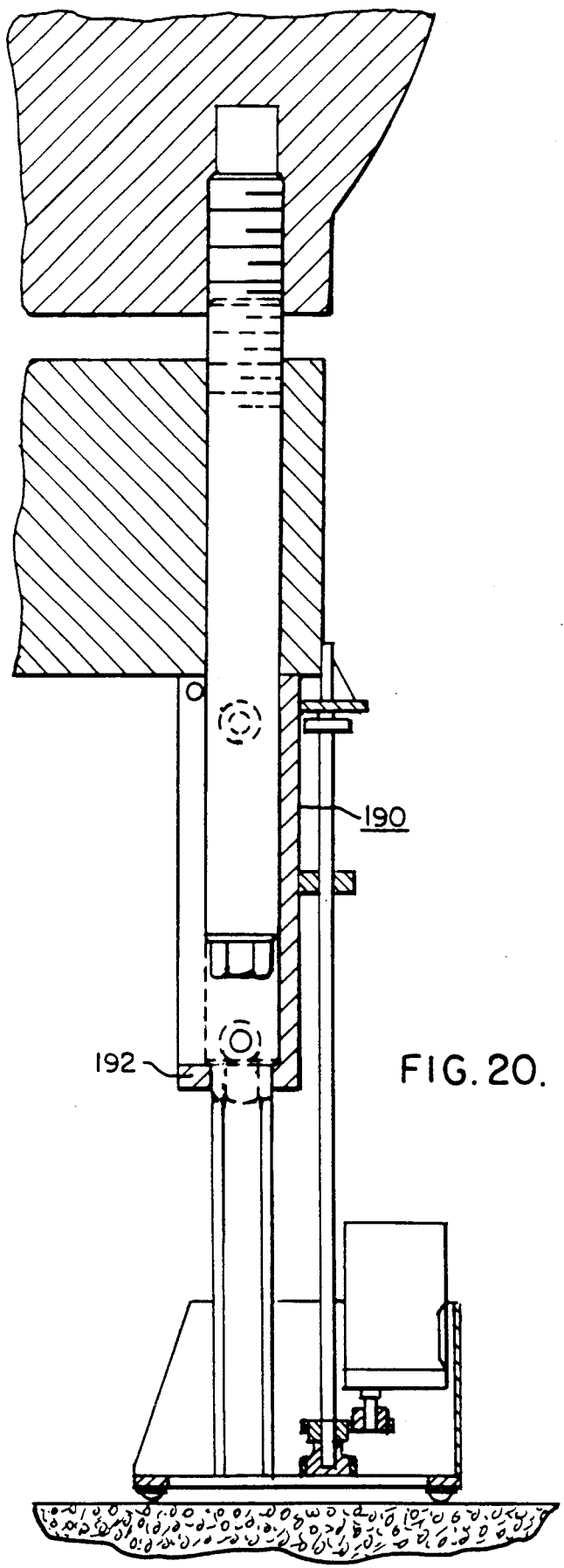
FIG. 20 and 21 illustrate a jack used to support, lower and lift pump unit studs as they are threaded or unthreaded into or from installed positions.
Figure 21:
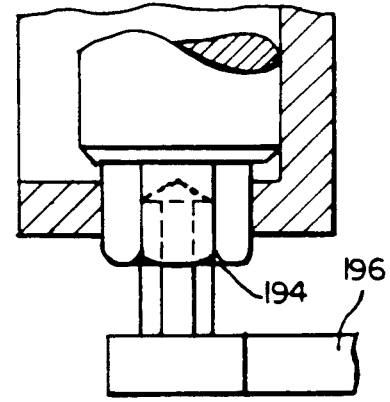

As shown in FIGS. 20 and 21, the stud jack 190 has an upper cup shaped arm 192 into which the bottom of the stud 104 projects. The end of the stud 104 is lowered to rest on the bottom of the jack arm 192. An internal stud hex 194 is accessible to a ratchet wrench 196 through an opening in the bottom of the jack arm 192. As the stud 104 is loosened, the jack 190 is progressively lowered until the stud 104 is completely unthreaded at which time the jack 190 holds the full weight of the stud 104 as the jack 190 is moved horizontally on the work platform to a point where service people can take the stud 104 and transfer it to a storage location. The opposite procedure is used when studs 104 are being installed.

A plurality of electrically operated lifting actuators are provided on the cart 120 to support, lower, and lift the motor 79 during service removal and installation. Preferably, three actuators 140, 142 and 144 (FIG. 10) are employed to provide triangulated support stability for the motor 79 and to facilitate motor tilting which permits motor lifting and lowering with the motor axis at an incline to the vertical. The motor motion can thus be aligned with the axis of the pump casing which will vary according to steam generator thermal conditions.

The actuators 140, 142, and 144 are commercially available unitized ball screw and gearmotor units such as Duff-Norton electromechanical actuators rated at 14,000 pound lift capacity and 39.00 lift and having a pivot mount at the upper end of the unit which supports the actuator in operating position and a clevis type connector at the lower end of the translating tube which supports the load to be lifted and lowered. An electrical control is included to provide highly accurate positioning of the translating tube.

As shown, respective actuator pivot mounts 200 are pin supported relative to the lugs 134, 136, and 138 on the top frame section of the cart 120. The lugs are located in a horizontal plane at the corners of a reference equilateral triangle. Further, they are positioned at locations equidistant from the vertical cart axis indicated by the reference character 201 in FIG. 11 to enable the motor casing contour to fit in the space inwardly of the actuators when the latter are assembled with the cart 120 to depend from the top cart frame section.

A motor unit 204 on each actuator provides screw drive which raises and lowers translating tube 204 under accurate operator control through an electronic control station (not specifically detailed in the drawings). Once the cart 120 is placed in its service position and respective actuator clevises 208 are pinned to the motor lifting lugs 110, 112, and 114, the motor 79 can thus be supported at selected elevations or moved vertically or on an incline from the vertical to provide for motor removal or installation. Under station control, the motor 79 can be lifted or lowered vertically through uniform actuator movements or on a vertical tilt through differential actuator movements.

MOTOR SERVICE OVERVIEW

To service installed motor units 79, slings are attached to the cart lifting eyes and to the plant lifting crane. The crane is then operated to lift the cart 120 from its storage location on the plant operating deck and lowered to the floor of the steam generator compartment. The stud tensioners are similarly lowered to the compartment floor 78.

Figure 19A:
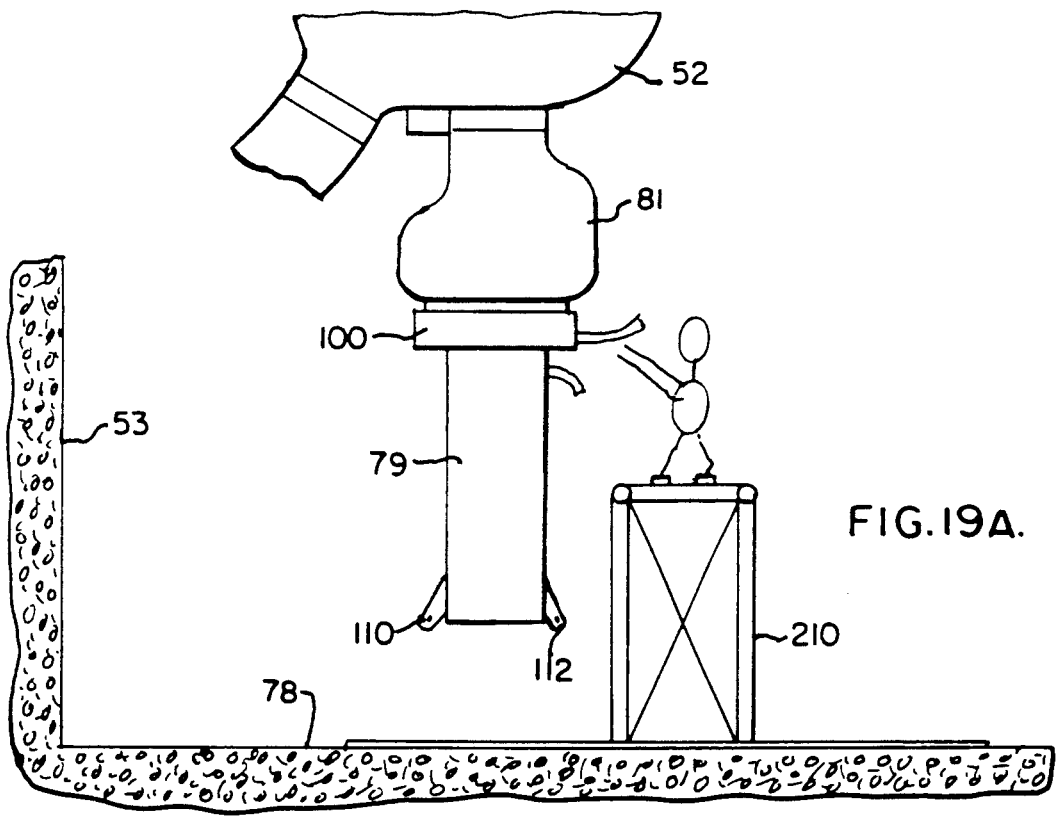
FIGS. 19A through 19F are a sequence of views illustrating the steps involved in using the cart and associated service apparatus to provide inverted canned pump motor service in accordance with the invention.
Figure 19B:
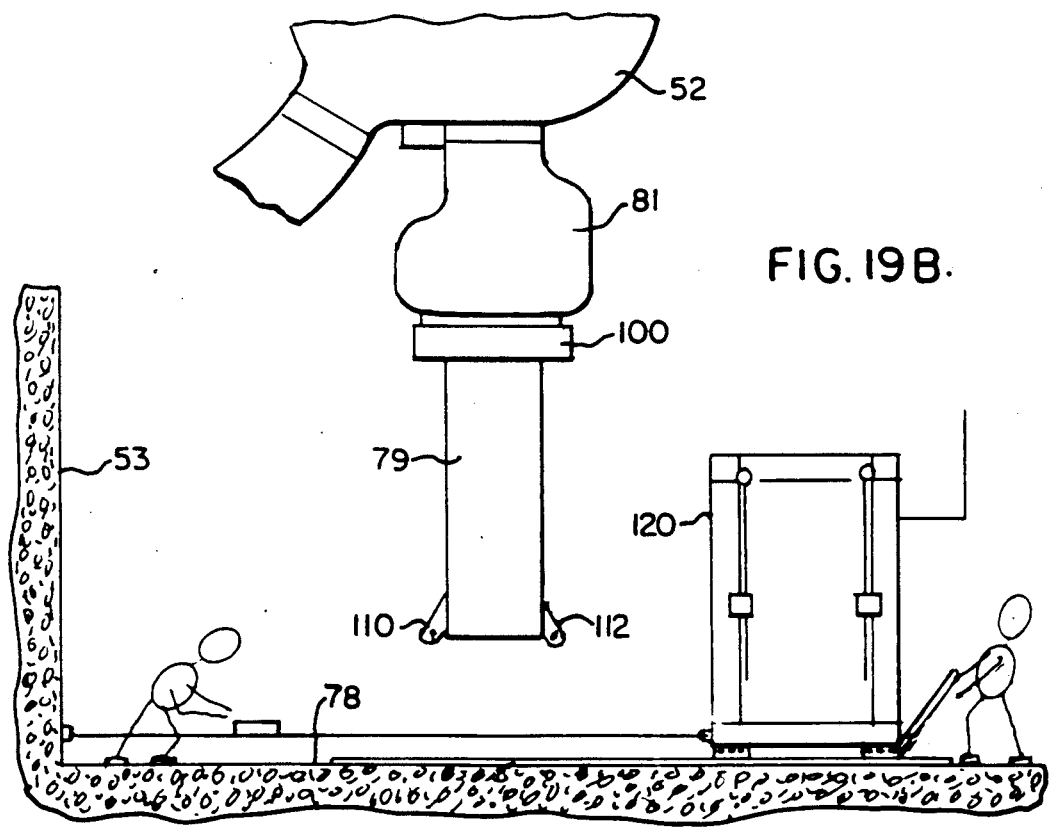

Once the cart 120 has been lowered to the steam generator compartment floor 78, service personnel first may use temporary scaffolding 210 to perform preparation tasks such as removing piping, wiring, hoses, etc., as illustrated in FIG. 19A. Next, as depicted in FIG. 19B, the scaffolding 210 is removed and the cart 120 is pulled into service position by powered winches or come-a-alongs attached to the compartment walls and steered by handles that attach to the individual cart rollers. As the cart 120 is moved into place, the bottom ends of the actuators 140, 142, and 144 are swung outwardly to clear the motor contour including the motor lift lugs 134, 136, and 138.

Figure 19C:
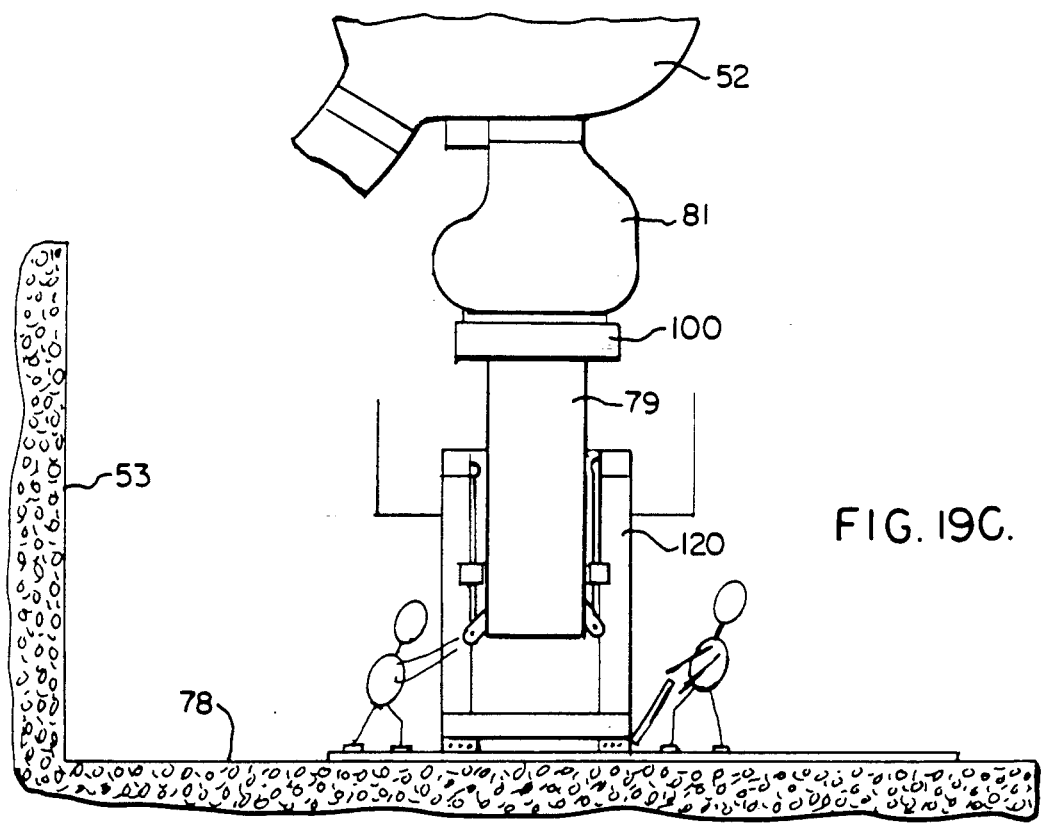

The hinged personnel platform sections are then raised (FIG. 19C) to their work positions and the removable personnel platform sections are put in place thereby providing a personnel platform that surrounds the motor 79. Further, the work platform removable section is installed to provide a work platform that surrounds the motor at a level above the personnel platform and just below the motor flange where the stud and nut handling is performed. Finally, the actuator clevises 206 are pinned to the motor lift lugs and the actuators are operated so that the actuators carry the full weight of the motor 79.

Figure 19D:
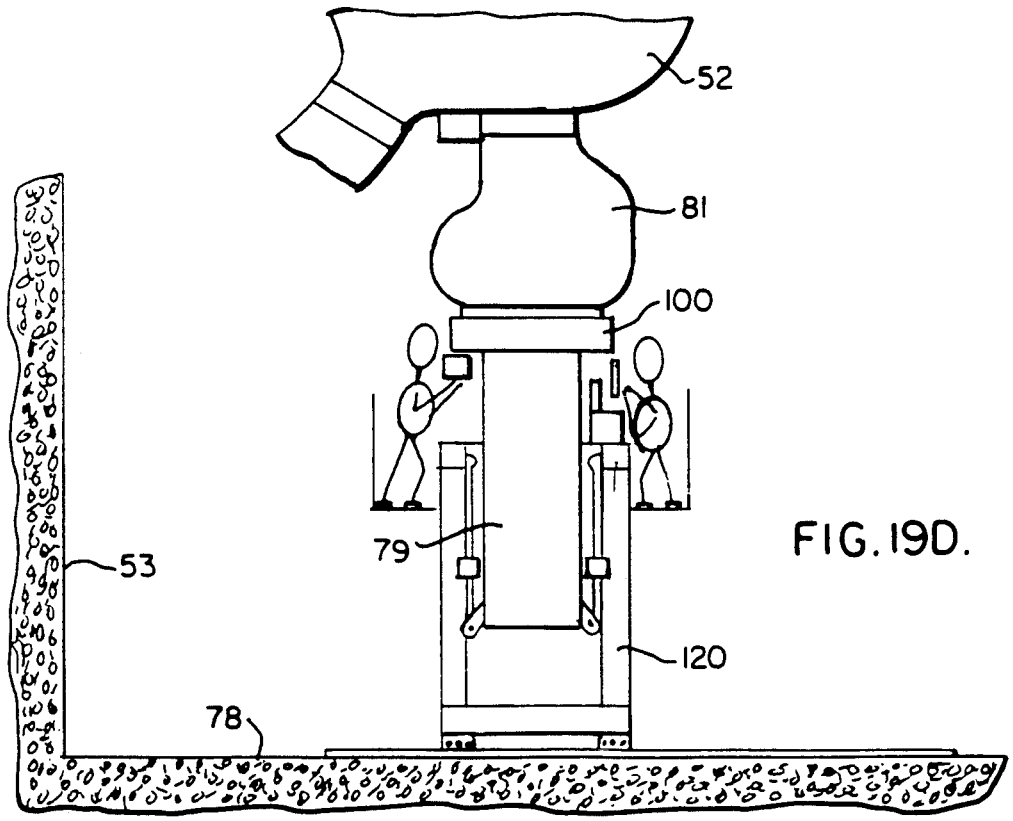

The stud tensioners are lifted in place on the studs 104 and the studs 104 are detensioned as previously described to permit nut removal (FIG. 19D). Once the nuts are removed, studs 104 are removed as previously described to the extent necessary to permit horizontal transfer of the motor 79 once it has been lowered for removal.

Figure 19E:
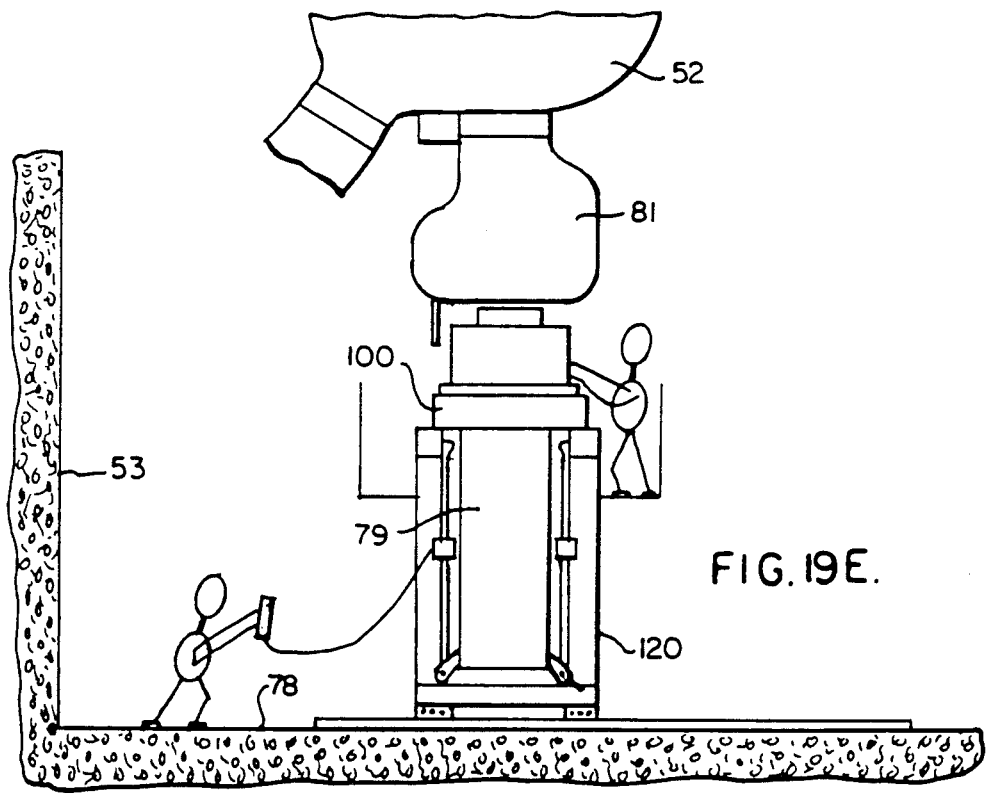
Figure 19F:
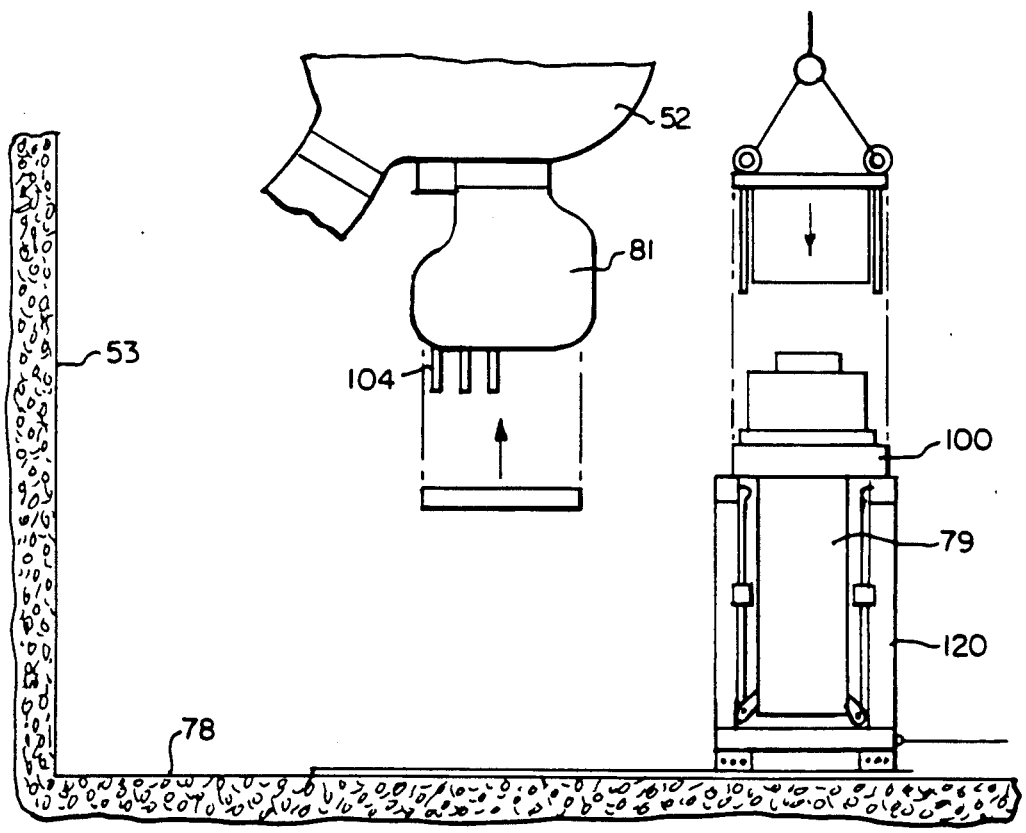

The actuators are then operated to lower the motor 79 as previously described to a resting position with the motor flange 100 on the cart plate 182 (FIG. 19E). The personnel platform sections are next lowered or removed and the cart 120 is moved away from the pump casing to a location near the compartment wall (FIG. 19F) where a radiation shielding cap is lowered onto the pump impeller and attached with long eyebolts. A shield is inserted into the pump casing 81 to block radiation otherwise shining down from above within the steam generator 52.

The cart 120 is then moved to the compartment wall and a sling is attached to the eyebolts. The actuators are disengaged and swung outwardly as the motor 79 is lifted from the cart 120. The removable section of the work platform is removed as the motor 79 is lifted. The motor 79 is then translated horizontally out of the cart 120 for lifting to the plant operating deck. The motor 79 for the other canned motor pump can then be removed for servicing in a like manner.

Generally, the opposite procedure applies to installation of pump motor units 79. During initial installation of pump motors, it is preferable that the installation position of the cart 120 under the pump casing 81 be marked on the floor to facilitate subsequent motor servicings. When raising the motor 79 toward the pump casing 81 from the cart 104, the motor flange is oriented so that its stud holes are aligned studs 104 depending from the pump casing 81. Further, the actuators are energized to tilt the motor 79 as necessary so that the inclination of the motor flange 100 is matched to the inclination of the pump casing flange as the motor is raised to its fully seated position.

As a result of the operation of the invention, inverted canned motor pump maintenance is facilitated and performed with significantly increased efficiency in use of time and limited space. With highly accurate control of pump motor movement, motor damage like that often caused through the use of jerry-rigged handling equipment in fossil power plants is essentially totally avoided.

What is claimed is:

1. Service apparatus for one or more inverted canned motor pumps installed above a floor and beneath a steam generator in a nuclear or fossil power plant with limited access space and limited access time at least in the case of nuclear power plants, each of said canned motor pumps having a pump casing and a depending motor having a flange secured to a pump casing flange by a plurality of tensioned studs with tightened nuts, said service apparatus comprising:
- a maintenance cart having a height greater than the height of the motor beneath the motor flange and further having a generally U-shaped frame means with an open vertical side that permits said cart to be moved horizontally such that said cart frame means can be moved under the pump casing to surround the depending motor;
- actuator means supported by said cart frame means and having translating arm means engageable with support means on said motor;
- means for operating said translating arm means to support, raise and lower said motor;
- means supported by said frame means to support the motor flange prior to raising the motor to its installed position and after the motor has been released from its installed position and lowered to said cart;
- work platform means provided on said cart frame means at an elevation beneath the motor flange elevation; and
- roller means provided on the bottom of said cart frame means to facilitate horizontal cart movement along the floor.

2. Service apparatus as set forth in claim 1 wherein said actuator means comprises three electromechanical actuators supported from said cart frame means substantially equidistantly about the contour of said motor and being differentially operable to enable said motor to be lifted and lowered with its axis at an incline to the vertical.

3. Service apparatus as set forth in claim 1 wherein said work platform means includes a removable section and means for supporting said removable work platform section across the open side of said frame means once said cart is positioned under the pump casing.

4. Service apparatus as set forth in claim 3 wherein said work platform means further includes a generally U-shaped plate secured to the top of said frame means and in general shape alignment therewith, an inside edge portion of said work platform plate forming an opening through said motor extends downwardly within said frame means when said cart is positioned under said pump casing and providing a support surface for said motor flange upon lowering said motor from its installed position and prior to raising said motor from its cart rest position to its installed position.

5. Service apparatus as set forth in claim 1 wherein hydraulically operated tensioner means are provided for tensioning and detensioning the studs to facilitate tight threaded securance of nuts to said studs on motor installation and to facilitate nut removal for servicing removal of said motor, and said work platform means provides a support surface for said tensioner means when said nuts are to be installed or removed.

6. Service apparatus as set forth in claim 1 wherein jack means are provided for lifting and lowering said studs as said studs are threaded into or unthreaded from said pump casing; said jack means supported on said work platform means as stud threading or unthreading is performed.

7. Service apparatus as set forth in claim 5 wherein jack means are provided for lifting and lowering said studs as said studs are threaded into or unthreaded from said pump casing; said jack means supported on said work platform means as stud threading or unthreading is performed.

8. Service apparatus as set forth in claim 2 wherein said cart frame means has a top U-shaped frame section, and mounting means for hanging said actuators from said top frame section.

9. Service apparatus as set forth in claim 8 wherein said work platform means includes a removable section and means for supporting said removable work platform section across the open side of said frame means once said cart is positioned under the pump casing; wherein said work platform means further includes a generally U-shaped plate secured to said top U-shaped frame section, and in general shape alignment therewith, an inside edge portion of said work platform plate forming an opening through said motor extends downwardly within said frame means when said cart is positioned under said pump casing and providing a support surface for said motor flange upon lowering said motor from its installed position and prior to raising said motor from its cart rest position to its installed position.

10. Service apparatus as set forth in claim 9 wherein hydraulically operated tensioner means are provided for tensioning and detensioning the studs to facilitate tight threaded securance of nuts to said studs on motor installation and to facilitate nut removal for servicing removal of said motor, and said work platform means provides a support surface for said tensioner means when said nuts are to be installed or removed; wherein jack means are provided for lifting and lowering said studs as said studs are threaded into or unthreaded from said pump casing; said jack means supported on said work platform means as stud threading or unthreading is performed; and wherein said top plate provides the work support surface for said tensioner means and said jack means.

11. Service apparatus as set forth in claim 1 wherein personnel platform means is provided on said cart at an elevation below the elevation of said work platform means, at least some sections of said personnel platform means being swingable from a horizontal operating position to a generally vertical storage position, and means for supporting said swingable sections in the horizontal operating position.

12. Service apparatus as set forth in claim 11 wherein a removable section is provided to extend across said open vertical side of said cart frame means in horizontal alignment with said swingable personnel platform sections once said cart is positioned under said pump casing, and means for supporting said removable personnel platform section.

13. Service apparatus as set forth in claim 4 wherein personnel platform means is provided an said cart at an elevation below the elevation of said work platform means, at least some sections of said personnel platform means being swingable from a horizontal operating position to a generally vertical storage position, and means for supporting said swingable sections in the horizontal operating position; wherein a removable section is provided to extend across said open vertical side of said cart frame means in horizontal alignment with said swingable personnel platform sections once said cart is positioned under said pump casing, and means for supporting said removable personnel platform section.

14. In a nuclear reactor power plant including steam generator having at least one canned motor pump installed beneath the steam generator, said canned motor pump having a pump casing and a depending motor having a flange secured to a pump casing flange, a service apparatus comprising:

a maintenance cart having a generally U-shaped frame with an open vertical side that permits said cart to be moved horizontally such that said cart frame can be moved under the pump casing to surround the depending motor;

actuator means supported by said cart frame and having translating arm means engageable with support means on said motor;

means for operating said translating arm means to support, raise and lower said motor;

means supported by said frame means to support the motor flange prior to raising the motor to its installed position and after the motor has been released from its installed position and lowered to said cart; and work platform means provided on said cart frame means at an elevation adjacent the motor flange.

15. The nuclear reactor power plant service apparatus as set forth in claim 14 wherein said actuator means comprises three electromechanical actuators supported from said cart frame means substantially equidistantly about the contour of said motor and being differentially operable to enable said motor to be lifted and lowered with its axis at an incline to the vertical.

16. The nuclear reactor power plant service apparatus as set forth in claim 15 wherein said cart frame means has a top U-shaped frame section, and mounting means for hanging said actuators from said top frame section.

17. The nuclear reactor power plant service apparatus as set forth in claim 16 wherein said work platform means includes a removable section and means for supporting said removable work platform section across the open side of said frame means once said cart is positioned under the pump casing; wherein said work platform means further includes a generally U-shaped plate secured to said top U-shaped frame section, and in general shape alignment therewith, an inside edge portion of said work platform plate forming an opening through said motor extends downwardly within said frame means when said cart is positioned under said pump casing and providing a support surface for said motor flange upon lowering said motor from its installed position and prior to raising said motor from its cart rest position to its installed position.

18. The nuclear reactor power plant service apparatus as set forth in claim 17 wherein personnel platform means is provided on said cart at an elevation below the elevation of said work platform means, at least some sections of said personnel platform means being swingable from a horizontal operating position to a generally vertical storage position, and means for supporting said swingable sections in the horizontal operating position.

19. The nuclear reactor power plant service apparatus as set forth in claim 18 wherein a removable section is provided to extend across said open vertical side of said cart frame means in horizontal alignment with said swingable personnel platform sections once said cart is positioned under said pump casing, and means for supporting said removable personnel platform section.

* * * * *